United States Patent
Burmeister et al.

(10) Patent No.: US 9,543,599 B2
(45) Date of Patent: Jan. 10, 2017

(54) FUEL CELL ASSEMBLY COMPRISING AN IMPROVED CATALYTIC BURNER

(75) Inventors: Uwe Burmeister, Munich (DE); Johann Huber, Finsing (DE); Norbert Ottmann, Regensburg (DE); Stefan-Ibrahim Peterhans, Gaissach (DE); Wolfgang Wagner, Neubiberg (DE); Christoph Weiser, Geretsried (DE)

(73) Assignee: MTU Onsite Energy GmbH, Ottobrunn (DE)

( * ) Notice: Subject to any disclaimer, the term of this patent is extended or adjusted under 35 U.S.C. 154(b) by 1078 days.

(21) Appl. No.: 13/120,061

(22) PCT Filed: Sep. 16, 2009

(86) PCT No.: PCT/EP2009/006701
§ 371 (c)(1),
(2), (4) Date: Jul. 20, 2011

(87) PCT Pub. No.: WO2010/031548
PCT Pub. Date: Mar. 25, 2010

(65) Prior Publication Data
US 2011/0269037 A1    Nov. 3, 2011

(30) Foreign Application Priority Data

Sep. 19, 2008  (DE) .................. 10 2008 047 920
Mar. 17, 2009  (DE) .................. 10 2009 013 598

(51) Int. Cl.
*H01M 8/06*  (2016.01)
*H01M 8/04*  (2016.01)
(Continued)

(52) U.S. Cl.
CPC ............ *H01M 8/04097* (2013.01); *B01F 3/02* (2013.01); *B01F 5/0646* (2013.01);
(Continued)

(58) Field of Classification Search
CPC  H01M 8/06; H01M 8/04014; H01M 8/04022; B01F 3/02; B01F 2015/0221; Y02E 60/526
(Continued)

(56) References Cited

U.S. PATENT DOCUMENTS 4,721,660 A * 1/1988 Kujas .................. H01M 4/90
                                                    429/101
5,856,034 A   1/1999 Huppmann et al.
(Continued)

FOREIGN PATENT DOCUMENTS

DE       4425186 C1    3/1996
DE       19947565 A1   4/2001

OTHER PUBLICATIONS

Interpretation of the Korean Office Action for Korean Application No. 10-2011-7008806.

*Primary Examiner* — Emily Le
*Assistant Examiner* — Monique Wills
(74) *Attorney, Agent, or Firm* — Fishman & Stewart PLLC

(57) ABSTRACT

There is disclosed a fuel cell assembly comprising at least one horizontally arranged fuel cell stack that has numerous fuel cells, each comprising an anode, a cathode and an electrolyte situated between the anode and the cathode; combustible gas supply means for supplying combustible gas to the anodes of the fuel cells; anode gas withdrawal means for withdrawing the anode exhaust gas from the anodes; cathode gas supply means for supplying cathode gas to the cathodes of the fuel cells; cathode gas withdrawal means for withdrawing the cathode exhaust gas from the fuel cells; and recirculation means for recirculating at least one part of the anode exhaust gas and/or the cathode exhaust gas to cathodes of the fuel cells. The fuel cell assembly according to the invention is characterized in that the (Continued)

recirculation means comprise at least one catalytic burner with catalyst material for burning the remaining combustible gas contained in the anode exhaust gas, said burner being situated at the side of the fuel cell stack.

20 Claims, 5 Drawing Sheets

(51) Int. Cl.
| | | |
|---|---|---|
| *B01F 3/02* | (2006.01) | |
| *B01F 5/06* | (2006.01) | |
| *B01F 15/02* | (2006.01) | |
| *H01M 8/24* | (2016.01) | |
| *H01M 8/14* | (2006.01) | |

(52) U.S. Cl.
CPC ....... *H01M 8/0662* (2013.01); *H01M 8/2485* (2013.01); *B01F 2015/0221* (2013.01); *H01M 8/04014* (2013.01); *H01M 8/04022* (2013.01); *H01M 8/247* (2013.01); *H01M 8/249* (2013.01); *H01M 8/2475* (2013.01); *H01M 2008/147* (2013.01); *H01M 2300/0051* (2013.01); *Y02E 60/50* (2013.01); *Y02E 60/526* (2013.01)

(58) Field of Classification Search
USPC .......................................... 429/415; 422/171
See application file for complete search history.

(56) References Cited

U.S. PATENT DOCUMENTS

| | | | |
|---|---|---|---|
| 5,935,277 A * | 8/1999 | Autenrieth et al. ......... | 48/127.9 |
| 2003/0157380 A1* | 8/2003 | Assarabowski et al. ....... | 429/13 |
| 2004/0005491 A1* | 1/2004 | Blanchet et al. ............... | 429/34 |
| 2004/0086765 A1* | 5/2004 | Florence et al. ............... | 429/34 |
| 2006/0141311 A1 | 6/2006 | Tang et al. | |
| 2006/0168893 A1* | 8/2006 | McMakin et al. .............. | 49/394 |
| 2007/0178338 A1* | 8/2007 | McElroy et al. .............. | 429/17 |
| 2008/0187794 A1 | 8/2008 | Weingaertner et al. | |
| 2010/0129270 A1* | 5/2010 | Roe et al. ..................... | 422/171 |

* cited by examiner (SdT)
(Prior Art)

(SdT)
(Prior Art)

FUEL CELL ASSEMBLY COMPRISING AN IMPROVED CATALYTIC BURNER

CROSS-REFERENCE TO RELATED APPLICATIONS

This application claims priority to German patent applications DE 10 2008 047 920.9 filed on Sep. 19, 2008 and DE 10 2009 013 598.7 filed on Mar. 17, 2009 and PCT application PCT/EP2009/006701 filed on Sep. 16, 2009, which are hereby incorporated by reference in their entireties.

BACKGROUND

To generate electrical power by means of fuel cells a larger number of fuel cells are ordinarily arranged in the form of a stack, each fuel cell having an anode, a cathode and an electrolyte arranged in between. The individual fuel cells are each separated by bipolar plates and electrically contacted. Current collectors are provided on the anodes and cathodes, which serve for electrical contact of the anodes and cathodes, on the one hand, and to supply reaction gases to them, on the other. Sealing elements are provided in the edge area of the anode, cathode and electrolyte matrix, which form lateral sealing of the fuel cells and therefore the fuel cell stack from emergence of anode and cathode gas.

The electrolyte material in a molten carbonate fuel cell typically consists of binary or ternary alkali carbonate melts (for example, mixed melts of lithium and potassium carbonate), which are fixed in a porous matrix. Molten carbonate fuel cells typically reach working temperatures of about 650° C. during operation. A reaction of hydrogen with carbonate anions to water and carbon dioxide with release of electrons then occurs on the anode side. Oxygen reacts with carbon dioxide to carbonate ions on the cathode side with absorption of electrons. Heat is then released. The alkali carbonate melts used as electrolyte, on the one hand, supply the carbonate ions necessary for the anode half-reaction and, on the other hand absorb carbonate ions that form in the cathode half-reaction. A hydrocarbon-containing energy carrier, like methane, for example, which can come from natural gas or biogas, as well as water, are generally supplied in practice to the anode side of the fuel cell, from which hydrogen required for the anode half-reaction is produced by internal reforming. The anode waste gas is mixed with additionally supplied air and then oxidized catalytically to eliminate any residual components of the fuel gas. The formed gas mixture now contains carbon dioxide and oxygen, i.e., precisely the gases required for the cathode half-reaction so that anode waste gas can be introduced directly to the cathode half-cell after fresh air supply and catalytic oxidation.

The hot exhaust emerging at the cathode output is pollutant-free and can be further used for heat. The electrical efficiency of the molten carbonate fuel cell is already 45 to 50% and when the heat released in the overall process is used, an overall efficiency of about 90% can be achieved.

The known fuel cell arranged by the applicant is described in detail, for example, in the international patent applications WO 96/02951 A1 and WO 96/20506 A1 and in German patent application DE 195 48 297 A1, incorporated herein in their entirety.

The essential components of the known fuel cell arrangement are schematically depicted in FIGS. 1 and 2 in a frontal and lateral cross-sectional view. The fuel cell arrangement designated overall with reference number 10 has a horizontally lying fuel cell stack 11, i.e., consisting of vertically arranged, plate-like elements, which is arranged in a heat-insulated, gas-tight protective housing 12. Fuel gas is supplied via a fuel gas line 13 into the interior of the gas-tight protective housing 12 and introduced into the anode chambers of the fuel cell stack 11 in a fuel gas distributor 16 arranged on the anode input 15 on the bottom of the fuel cell stack 11 via a heat exchanger 14. The fuel gas flows through the anode chambers in essentially a vertical direction and emerges again on the anode output side 17 situated on the top of the fuel cell stack. The heat exchanger 14 is a gas/gas heat exchanger, which is traversed, on the one hand, by the fuel gas and, on the other hand, by a stream of cathode gas circulated within the gas-tight protective housing 12.

The cathode gas enters the fuel cell stack 11 at the cathode input 18 arranged laterally and leaves it at the cathode output 19 on the opposite side of the fuel cell stack. As can be deduced from FIG. 1, the flow directions of the cathode gas and fuel gas are perpendicular to each other. Maintenance of the gas streams in the protective housing 12 is accomplished by means of two fans 20, 21 arranged above the fuel cell stack 11, each of which are driven by electric motors 22, 23. A diffuser 24 and a static mixer 25 following it are arranged directly above the anode output 17 of the fuel cell stack 11. The anode waste gas leaving the anode output 17 is mixed with the cathode gas stream circulating in the housing 12 in the static mixer 25. Fresh air is also introduced to static mixer 24 via a line 26. Under the action of fans 20, 21 the gas mixture of anode waste gas, circulated cathode gas and fresh air is fed into a catalytic burner 27 arranged above the static mixer 25, in which combustible residual components of the anode waste gas are catalytically burned and converted to useful heat. The gas mixture leaving the catalytic burner, which now contains the main components of the cathode reaction with oxygen and carbon dioxide, is directed via fans 20, 21 to the cathode input 18, where it then flows through horizontally to the fuel cell stack 11. As mentioned above, after emergence at the cathode output 19, a partial stream of the cathode gas is fed back to the static mixer 24. A start heater 28 is preferably arranged in front of the cathode input 18, which brings the process gases to the operating temperature of about 600° C. during startup of the fuel cell arrangement 10. A diffuser 29 can also be arranged in front of the cathode input 18, which is supposed to permit homogeneous flow against the cell stack together with additional internals provided between fans 20, 21 and the cathode input 18. However, if, as in the depicted example, the heat exchanger 14 is also arranged in front of the cathode input 18, homogeneous flow against the cell stack can also be guaranteed by an appropriate configuration of the heat exchanger so that the additional diffuser 29 can optionally be dispensed with. Excess cathode exhaust leaves the fuel cell stack 11 via a cathode exhaust line 30 shown only schematically here.

The fuel cell arrangement described here is marketed by the applicant under the name HM 300 in a circular cylindrical protective housing.

In this known design principle the static mixer, the catalytic burner and the fans connected to them are directly arranged above the anode output of the fuel cell stack, which imposes high flow requirements on the circulation fan, namely both with respect to suction behavior of the fan in order to guarantee uniform mixing of fresh air, anode waste gas and cathode exhaust in the static mixer, and with respect to outflow behavior of the fan in order to guarantee uniform flow against the cell stack by the gas mixture. These requirements can be guaranteed in the previous design only by rectifiers and internals in the flow path, which, however, lead to pressure losses, which again requires higher fan power. In cell stacks with several hundred individual cells several fans arranged along the cell stack are also required in order to achieve homogeneous flow behavior.

A further drawback of the previous design is that the catalytic burner is arranged above the cell stack between the static mixer and fan. The catalyst during the operating time, however, is exposed to soiling, which can lead to a deterioration in flow and additional pressure losses so that the catalyst must regularly be cleaned. In the previous arrangement, however, the complete cell stack must be disassembled for this purpose, which is connected with a very high work cost and can only be conducted by the manufacturer.

Another drawback of the known design is that the mixer must be designed very compact directly above the anode output because of the limited space available so that satisfactory mixing can only be achieved by numerous internals with correspondingly high pressure loss. The manufacturing costs of the previously used mixer are therefore high.

Finally, the previous fuel cell arrangement permits only a few design degrees of freedom. The ratio of height and width of the fuel cell stack and the additional components arranged in the protective housing is essentially stipulated by the use of a circular cylinder protective housing and the degrees of freedom with respect to arrangement and dimensioning of the components arranged in the protective housing are limited. The layout of individual components specifically adapted to each other also means that numerous components must be newly designed, depending on the power layout of the system. The assembly cost of the previously used fuel cell arrangement is also high.

BRIEF DESCRIPTION

In one embodiment of the present disclosure concerns a high temperature fuel cell arrangement, especially a molten carbonate fuel cell arrangement, as well as a method for operation of such a fuel cell arrangement.

The underlying technical problem of the present disclosure is therefore to further improve the described design principle of a fuel cell stack integrated in a protective housing with cathode gas stream circulating in the protective housing.

The applicant was able to integrate the fuel cell stack and all system components operating at high temperature in a common gas-tight protective housing. The efficiency of the system is therefore improved, on the one hand, and an arrangement could be achieved, on the other, in which the cathode gas stream can circulate freely in the internal space of the protective housing and the anode waste gas stream can be introduced freely into the circulating cathode gas stream. Whereas a gas distributor and gas collector are provided in ordinary fuel cell stacks at each anode input, anode output, cathode input and cathode output, which must be sealed relative to the fuel cell stack in costly fashion, in the known system of the applicant, owing to the cathode gas stream freely circulating in the protective housing, a gas distributor sealed relative to the fuel cell stack is provided at the anode input, but no gas distributor is necessary at the cathode input so that the overall design can be significantly simplified.

In one embodiment of the present disclosure solves these technical problems by providing a fuel cell arrangement with at least one horizontally arranged fuel cell stack, which has numerous fuel cells, each of which includes an anode, a cathode and an electrolyte arranged between the anode and cathode. At least one fuel gas feed device appears to feed fuel gas to the anodes of the fuel cells. An anode gas withdrawal device to withdraw the anode waste gas from the anodes, and a cathode gas feed device to feed cathode gas to the cathodes of the fuel cells. A cathode gas withdrawal device is present to withdraw cathode exhaust from the fuel cells and at least one return device to return at least part of the anode waste gas and/or cathode exhaust to the cathodes of the fuel cells. The return device has at least one catalytic burner with catalyst material for burning of residual combustible gas contained in the anode waste gas, which is arranged laterally next to the fuel cell stack.

It is proposed according to the one embodiment of the disclosure not to draw off the mixture of fresh air, anode waste gas and cathode exhaust after passing through the catalytic burner directly by the fan, but to collect it initially in a suction tube, which discharges into the fan. Mixing and catalytic burning of the drawn-in gas already occurs before the suction tube so that optimal suction by the fan is guaranteed. Because of flow guiding in a suction tube the fan can be arranged next to the protective housing and communicate with the internal space of the housing through standardized suction and discharge connectors. Since the protective housing and the flanged-on fan form two separate assemblies, both assemblies can be designed and optimized independently of each other. An optimized distributor for longitudinal distribution of the gas mixture coming from the fan can be arranged in the space gained above the cell stack so that the suction and outflow properties of the fan itself are not critical. Uniform flow against the cell stack is guaranteed without demanding rectifiers and internals by means of a flow distributor that tapers wedge-like in the longitudinal direction of the fuel cell stack so that pressure losses can be significantly reduced relative to the previous design. The power requirements on the fan are also reduced accordingly. It was surprisingly found that cell stacks with up to 600 individual units can be supplied with a single fan with the arrangement proposed according to the disclosure.

It is also proposed according to the disclosure to arrange the catalytic burner on the cathode output side between the fuel cell stack and the wall of the protective housing. Because of this arrangement the catalyst is more readily accessible so that maintenance for cleaning purposes is simplified. For example, cleaning/filling openings can be provided in the wall of the protective housing so that disassembly of the cell stack is no longer required. Cleaning of the catalyst can therefore be carried out by the user. In contrast to the previously used fuel cell arrangement the catalytic burner is traversed from the top down so that the use of pelletized catalysts is now also made possible. In the prior art pelletized catalysts could not be used, since suspension of the catalyst particles in the air stream occurs during flow from the bottom up, which entails strong mechanical wear on the catalyst elements. However, the previously preferably used honeycomb catalysts can likewise also be used in the present disclosure.

A simple gas mixer with lower pressure losses is also furnished according to the disclosure. The gas mixer has a first mixing zone in which cathode exhaust is mixed with fresh air, as well as a second mixing zone in which anode waste gas is introduced to the mixture of cathode exhaust and fresh air. The mixer is preferably arranged on the cathode output side between the cell stack and the wall of the protective housing above the catalytic burner also provided there. Long mixing zones can therefore be implemented so that fewer internals and mixing elements are required in order to guarantee homogeneous mixing of the cathode and anode waste gas streams and the fresh air. The pressure loss in the mixture relative to the known mixers arranged on the fuel cell stack is therefore significantly reduced. In addition, the mixer according to the disclosure can be made light and can be easily and cost effectively manufactured because of the simple sheet metal parts, which reduces the overall cost of the fuel cell arrangement.

The fuel cell arrangement according to the one embodiment of the disclosure is arranged in functional groups that can be dimensioned and optimized largely independently of each other.

One functional group then consists of a fuel cell stack with anode input gas distributor and the anode output gas collector. In contrast to the ordinary design in which the fuel cell stack also included components like the heat exchanger, static mixer and catalytic burner, the now proposed assembly can be constructed much more simply. Another functional group consists of the cathode gas feed with distributor channel, start heater and heat exchanger. This functional group can be preassembled completely outside the container and integrated before insertion of the stack.

Another functional group consists of the mixer and catalyst unit with sheet metal internals for mixing of fresh air, cathode exhaust and anode output gas, the catalyst housing and catalyst output flow collector with baffles.

Another functional group consists of the circulating fan with impeller housing and connections on the suction side via a suction tube to the catalyst output housing and on the pressure side to the cathode gas distributor channel.

It is proposed according to the disclosure to design the protective housing rectangular so that the design of the components of the fuel cell arrangement according to the disclosure is independent of the width to height ratio.

The functional group can be largely preassembled outside the module, which facilitates and accelerates assembly.

BRIEF DESCRIPTION OF THE FIGURES

The disclosure is further explained below with reference to a practical example depicted in the accompanying drawings.

In the drawings

DETAILED DESCRIPTION

Figure 1:
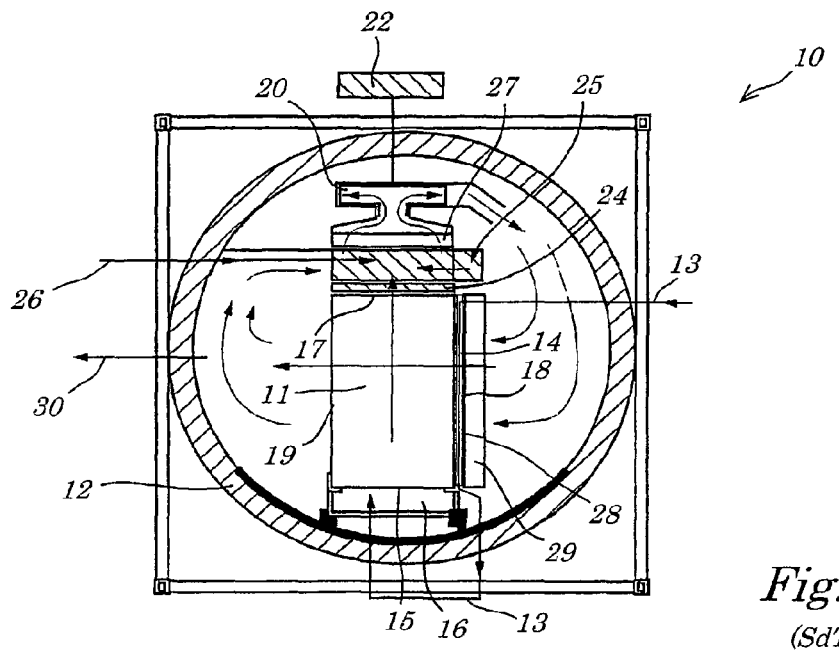
FIG. 1 shows a frontal cross-sectional view of a fuel cell arrangement of the prior art.
Figure 2:
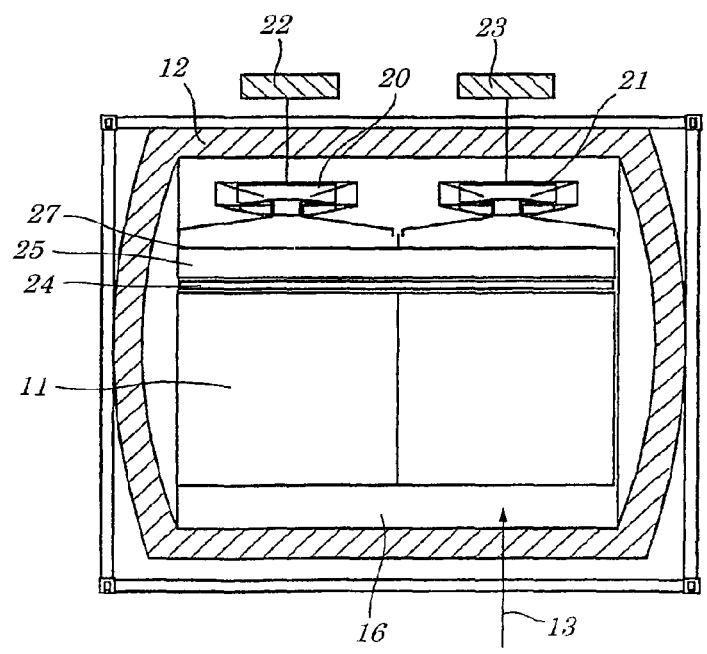
FIG. 2 shows a lateral cross-sectional view of a fuel cell arrangement of the prior art.
Figure 3:
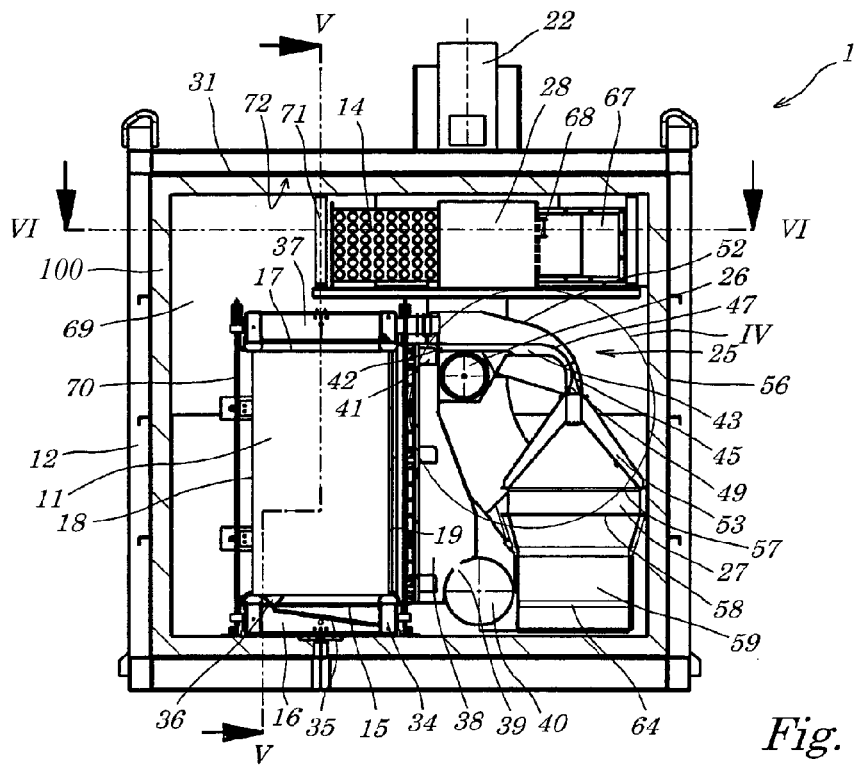
FIG. 3 shows a frontal cross-sectional view of a fuel cell arrangement according to one variant of the disclosure.

The fuel cell according to the prior art was already described above in conjunction with FIGS. 1 and 2.

With reference to FIGS. 3 to 7 two preferred variants of the fuel cell arrangement according to the disclosure are described below. Components that are identical to components of the fuel cell arrangement of the prior art or have the same or similar function are then referred to with the same reference numbers.

Figure 7:
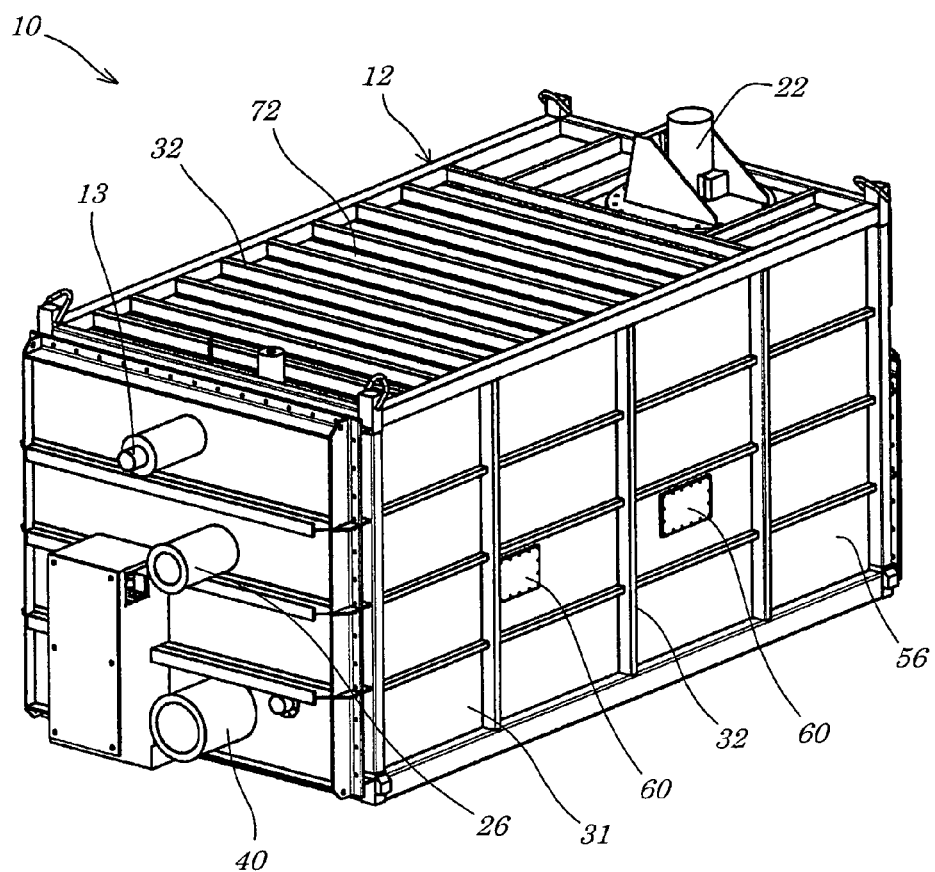
FIG. 7 shows a schematic perspective view of the gas-tight housing of a variant of the fuel cell arrangement of FIGS. 3-6.

The fuel cell arrangement designed overall with reference number 10, like the fuel cell arrangement of the prior art, has a horizontally lying fuel cell stack 11 consisting of vertically arranged plate-like elements, which is arranged in a heat-insulated, gas-tight protective housing 12. In contrast to the protective housing of the fuel cell arrangement of the prior art, the protective housing of the fuel arrangement 10 according to the disclosure is designed essentially rectangular. The gas-tight protective housing 12 consists of individual metal plates 31 connected to each other, for example, welded to each other, which, as is especially recognizable in FIG. 7, are stabilized on the outside by steel supports 32, which impart the necessary rigidity to the overall fuel cell arrangement 10. An appropriate insulation material 100 for heat insulation of the internal space of the protective housing 12 is applied to the inside of metal plates 31. The protective housing 12 can be easily adapted to the altered dimensions of the fuel cell stack, which thus permits cost-effective production of fuel cell arrangements with different power.

The fuel cell stack 11 again has a cathode input side 18, cathode output side 19, an anode input side 15 and an anode output side 17.

Fuel gas arrives in the interior of the gas-tight protective housing 12 via fuel gas feed devices, which include a fuel gas line 13, and is initially passed through a heat exchanger 14, which, in contrast to the prior art, is arranged above the fuel cell stack 11. The heat exchanger 14 is also designed as a gas/gas heat exchanger in the fuel cell arrangement 10 according to the disclosure, which is traversed on one side by the fuel gas and on the other side by a stream of cathode gas circulating within the gas-tight protective housing 12 so that the fuel gas is preheated before introduction into the fuel cell stack 11. After passing through heat exchanger 14, the heated fuel gas reaches a fuel gas distributor 16 arranged on the bottom of the fuel cell stack 11 via a line 33 arranged on the end of the fuel cell stack, which distributes the fuel gas to the anode chamber inputs of the individual fuel cells of the stack. In the depicted example the fuel gas, however, does not directly enter the anode chambers. Instead reformer elements designed plate-like are arranged between the cell elements of the fuel cell stack 11, which reform at least part of the fuel gas before introduction into the anode chambers of the fuel cells in known fashion. The heated anode gas in the special variants of the disclosure depicted in FIGS. 3 to 6 is supplied via line 33 initially into an edge strip formed as a hollow line 34 of the anode gas distributor 16, which serves as longitudinal distributor. Along the hollow line 34 numerous distributor lines 35 branch off laterally, which supply the fuel gas into the inputs of the separate plate-like reformer units of the fuel cell stack via V-shaped distributor heads 36 arranged on the ends of the distributor lines. After passing through the reformer units, which can be arranged, for example, alternating with fuel cell elements in the fuel cell stack 11, or which are provided after a certain number of fuel cell elements, for example, always after five fuel cell elements, the at least partially reformed fuel gas is returned into the interior of the fuel gas distributor 16 and goes from there to the anode inputs of the fuel cell elements of the stack. In a preferred variant of the fuel cell arrangement according to the disclosure, in addition to these separate reformer elements for the so-called indirect internal reforming, reformer catalyst for the so-called direct internal reforming is arranged in the anode chambers of the fuel cell elements. Sealing between the distributor lines 35 and the internal space of the fuel gas distributor 16 is therefore not critical because unreformed fuel gas that directly reaches the internal space of the fuel gas distributor 16 through possible leaks can also be directly reformed in the fuel cell elements. After flowing through the fuel cell stack 11 from the bottom up, the anode waste gas emerges at the anode output 17 on the top of the fuel cell stack 11 and is trapped by an anode waste gas collector 37 and fed laterally to a gas mixer 25, which is apparent in FIG. 3 and especially in the enlarged depiction in FIG. 4 and is described in detail further below.

The cathode gas circulating in the gas-tight protective housing 12 enters the cathode chambers of the fuel cell elements on the open cathode input side 18 of the fuel cell stack 11 and leaves the stack on the cathode output side 19 after passing through the fuel cell stack essentially horizontally, on which a cathode exhaust collector 38 is arranged. The cathode exhaust collector 38 is connected via openings 39 to a cathode exhaust line 40, via which excess cathode exhaust is taken off from the fuel cell arrangement 10. Part of the cathode exhaust, however, also circulates in the protective housing 12 and, after mixing with the anode waste gas and the fresh air in the gas mixer 25 and subsequent after-burning in a catalytic burner 27 described further below, enters the fuel cell stack 11 again on the cathode input side 18 as so-called cathode gas.

The cathode exhaust collector 38 arranged on the cathode output side has a gap opening 42 extending essentially over the entire length of the fuel cell stack 11 in its upper area 41, through which the circulating fraction of the cathode exhaust in the protective housing 12 reaches the downstream gas mixer 25. The gas mixer 25 has a first mixing zone 43, in which the cathode exhaust leaving the cathode exhaust collector via the gap opening 42 and fresh air are introduced. The fresh air is fed via a fresh air line 26 running essentially parallel to the fuel cell stack, which has at least one opening 44 along the mixer, for example, a gap opening running in the longitudinal direction, or several openings, through which fresh air can enter the first mixing zone 43. The gas mixer 25 also has a second mixing zone 45 arranged downstream over the first mixing zone 43, into which anode waste gas is introduced to the mixture of cathode exhaust and fresh air. The gas stream runs essentially horizontally in the first mixing zone 43, whereas it is deflected downward in the transitional region 46 from the first to second mixing zone. The gas mixer 25 is also designed so that the flow cross section of the first mixing zone 43 and the flow cross section of the inflowing anode waste gas is tapered to the second mixing zone 45 so that the anode waste gas and the already premixed mixture of cathode exhaust fresh air are accelerated to the second mixing zone 45. At the level of the first mixing zone and in the transitional region from the first to second mixing zones the anode gas stream and the stream of the mixture of cathode exhaust and fresh air run essentially parallel so that the anode waste gas stream is introduced essentially tangentially into the mixture of cathode exhaust and fresh air. In the region of the first mixing zone 43 the anode waste gas stream and the mixture of cathode exhaust and fresh air are separated by a baffle 47, which ends in the transitional region from the first to second mixing zones. This end of the baffle 47 has a number of tongues 49, which are bent upward or downward in alternation in the longitudinal direction and are welded to the top 50 or bottom 51 of the housing 52 of the gas mixer 25. These tongues 49 ensure additional swirling of the gas mixture and guarantee homogeneous mixing of the anode waste gas, cathode exhaust and fresh air. In addition or as an alternative, other static mixing elements can be provided. The second mixing zone 45 also includes a distributor 53, which widens from a first flow cross section at the input 54 of the distributor to a second flow cross section at the output 55 of the distributor, in which the flow cross section at the output of the distributor essentially corresponds to the surface of the inlet opening on the top of a catalytic burner 27 arranged after the gas mixer 25 for burning of the fuel gas contained in the anode waste gas. As is especially apparent from FIG. 3, the gas mixer 25 is arranged essentially between the fuel cell stack and a side wall 56 of the gas-tight protective housing enclosing the fuel cell stack. Relative to the prior art, longer mixing zones can therefore be implemented. More effective mixing can also be achieved without excessive use of numerous static mixing elements that increase flow resistance.

The catalytic burner 27 following the gas mixer 25 is also arranged laterally next to the fuel cell stack 11 on the side wall 56 of the gas-tight protective housing 12. The catalytic burner 27 has a top with at least one inlet opening 57, which communicates with the gas mixer 25 for mixing of anode waste gas, cathode exhaust and fresh air. The catalytic burner has at least one outlet opening 58 on its bottom, which communicates with a collector 59 for collection of the waste gases to be returned to the cathode input. The catalytic burner 27 can include, for example, a honeycomb catalyst. Due to flow guiding of the waste gas proposed according to the disclosure from the top down through the catalyst, the catalyst material is not exposed to increased abrasion so that the catalytic burner 27 according to the disclosure can be designed, in particular, as a pelletized catalyst. Owing to lateral arrangement next to the fuel cell stack, the catalytic burner 27 is situated in the immediate vicinity of a side wall 56 of the protective housing 12 of the fuel cell arrangement 10 according to the disclosure so that the catalyst material can be cleaned or replaced particularly simply. For this purpose, one or more cleaning openings are provided in the side wall 56 of the protective housing 12 of one or more cleaning openings 60 (see FIG. 7). The cleaning openings 60 are recognizable, in particular, in the perspective view in FIG. 7 of a variant in the version of FIGS. 3 to 6. Catalyst material can be drawn off through the cleaning openings 60 by means of a suction fan, for example. In contrast to the prior art, no demanding disassembly is therefore required. Access can be achieved directly to the catalyst material via the cleaning openings 60 and the side wall 56, for example if the catalytic burner has a permanently opened access at a corresponding height and largely gas-tight sealing of the edge of the access is guaranteed with the inside of the side wall 56 of the protective housing 12. As in the depicted variant, the catalytic burner 27 or the oblique section of the distributor 53 lying directly above it has a closable access opening 61 to the catalyst material at the level of cleaning opening 60 (cf. FIG. 5).

To maintain circulation of the cathode gas, i.e., the mixture of cathode exhaust, anode waste gas and fresh air finely burned in the catalytic burner, return devices to return at least part of the anode waste gas and at least part of the cathode exhaust to the cathode inputs 18 and the cathode chambers of the fuel cells of stack 11 are provided. The return devices include at least one collection line 59 arranged on a longitudinal side of the fuel cell stack for collection of the return waste gases, which discharges into an inlet 62 of a feed device arranged on the front of the fuel cell stack, which includes circulation fan 20 and an electric motor 22. The circulation fan has an outlet 63, which communicates with the cathode gas feed devices, which supply the gas mixture to the input of the cathode chamber.

Collection line 59 is an essentially horizontally running collection line that extends over essentially the entire length of the fuel cell stack 11 in the foot area of the fuel cell stack 11. Numerous baffles 64 are arranged in the collection line 59, which deflect the vertical gas stream coming from the gas mixer 25 and catalytic burner 27 into a horizontal gas stream along the longitudinal axis of collection line 59. The baffles 64 are designed as bent sheets and are arranged offset relative to each other in the horizontal and vertical direction so that uniform horizontal flow without additional swirling is generated. The baffles are preferably arranged on a space diagonal that runs from the lower end of the horizontal section of the collection line 59 away from the inlet 62 of the circulation fan 20 to the upper end of the horizontal section of collection line 59 directed toward the inlet 62. Baffles 65 are again arranged on the end of the horizontal section of collection line 59, which divert the gas stream upward into an essentially vertical line section 66 to the inlet 62 of circulation fan 20. At the outlet 63 of the circulation fan 20 the gas distributor 67 is connected, which extends essentially over the entire length of the fuel cell stack in the head area of the fuel cell stack. The gas distributor 67 has lateral outlet opening 68 arranged parallel to its longitudinal axis, through which the gas mixture can flow into a heating device 28 serving as start heater arranged after the outlet openings of the gas distributor. As is apparent especially in FIG. 6, the cross-sectional surface oriented perpendicular to the longitudinal axis of the internal space of gas distributor 67 tapers from its end arranged at the outlet 63 of the circulation fan 20 to its opposite end so that the amount of gas emerging laterally from the outlet opening 68 is essentially constant over the entire length of the gas distributor 67. The start heater 28 arranged after the gas distributor 67 during startup of the fuel cell arrangement 10 heats the circulating gas mixture to the operating temperature. The already mentioned heat exchanger 14 is connected directly to the start heater 28, in which the circulating cathode gas is brought into thermal contact with the fuel gas introduced to the protective housing 12. After flowing through the heat exchanger 14, the circulating cathode gas flows freely through the internal space 69 of the protective housing 12 back to the input 18 of the fuel cell stack 11 on the cathode side.

Figure 4:
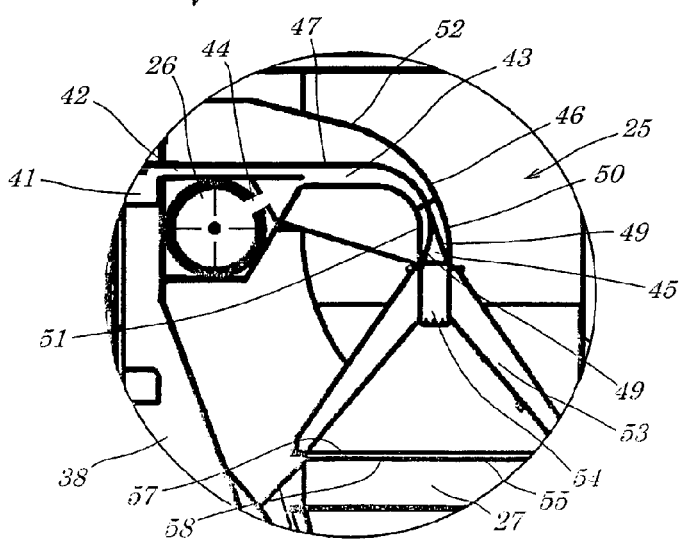
FIG. 4 shows an enlarged detail view with an area of FIG. 3 marked with circle IV.
Figure 5:
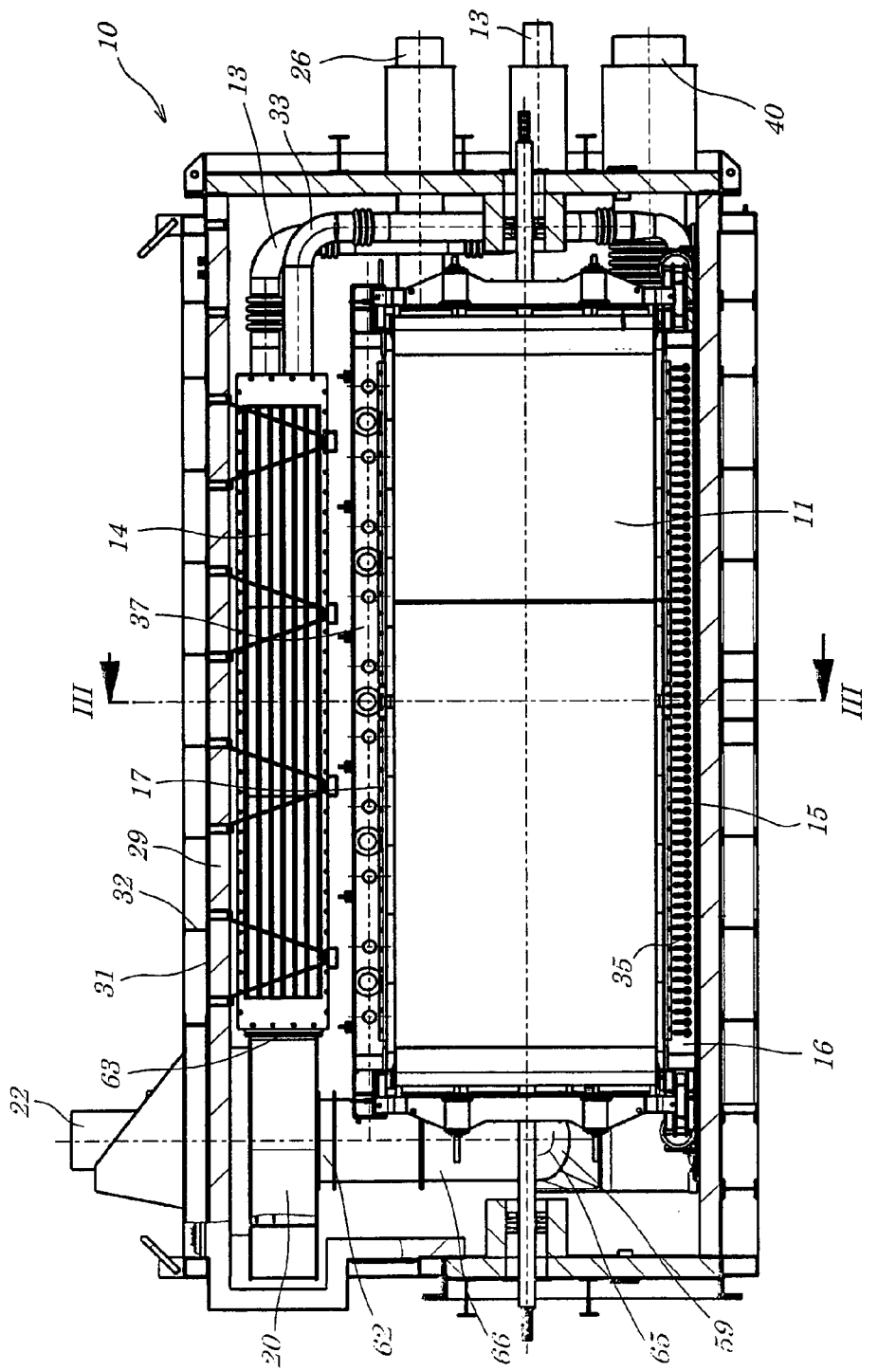
FIG. 5 shows a lateral cross-sectional view of the fuel cell arrangement according to the disclosure depicted in FIG. 2 along line V-V in FIG. 3.
Figure 6:
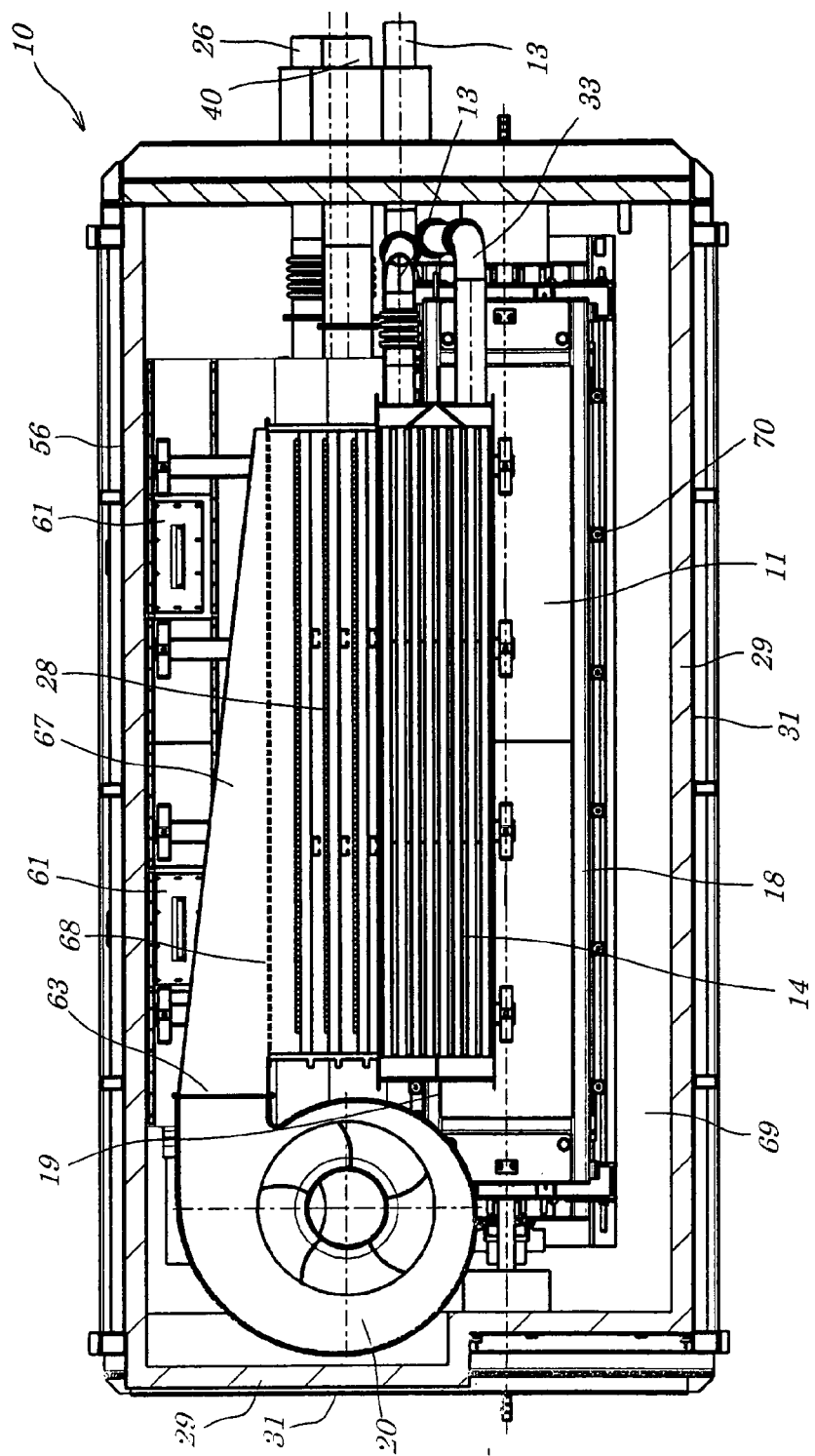
FIG. 6 shows a top cross section of the fuel cell arrangement according to the disclosure depicted in FIG. 2 along line VI-VI of FIG. 3.

The variant of the fuel cell arrangement according to the disclosure depicted in FIG. 7 differs from the variant depicted in FIGS. 3 to 6 only in that in the variant according to FIG. 7 the fuel cell line 13 discharges linearly at the level of the heat exchanger 14 (see FIG. 6) into the protective housing 12, whereas the fuel cell line 13 in the variant of FIGS. 4-6 discharges into the protective housing beneath the fresh air line 26 and, as is especially apparent in FIG. 5, is deflected upward in the direction of the heat exchanger 14 within the protective housing.

As can be deduced in the variants depicted in the figures, the fuel cell arrangement according to the disclosure favors a modular design from largely independent assemblies that communicate with each other via standardized interfaces.

In a fuel cell arrangement according to the disclosure a first assembly includes the fuel cell stack 11 with the fuel gas feed devices, especially the fuel gas line 13 and the fresh air feed line, and the anode gas withdrawal devices, especially the anode waste gas collector 37. The anode gas collector 37 is tightened by means of a clamping device 70 in the housing with the fuel cell stack and the fuel gas distributor 16 arranged at the anode input.

The second assembly includes the cathode gas feed device with cathode gas distributor 67, start heater 28 and heat exchanger 14, which are mounted in an assembly frame 71 on the bottom of the cover 72 of the protective housing 12.

The third assembly includes the cathode exhaust collector 38, a cathode exhaust line 40, a gas mixer 25 for mixing of fresh air, cathode exhaust and anode waste gases, a catalytic burner 27 and a collection line 59 of the return device. In the depicted variant the third assembly is divided into a first subassembly, which includes the cathode exhaust collector 38 and the cathode exhaust line 40, as well as a second subassembly, which includes the gas mixer 25, the catalytic burner 27 and the collection line 59 of the return device.

Finally a fourth assembly includes the feed device of the return device, which consists of a circulation fan 20 with an impeller housing and connections on the suction side (e.g., outlet 63), which communicate with the collection line 59 of the third assembly, and connections on the pressure side (e.g., inlet 64), which communicate with the cathode gas distributor 67 of the second assembly, as well as the electric motor 22 to drive the circulation fan 20.

The assemblies are arranged in the interior of the gas-tight protective housing 12, in which the protective housing has an essentially cuboid general shape.

A particular advantage of the arrangement according to the one embodiment of the disclosure is seen in the fact that the second and fourth assemblies can be connected beforehand to the inside walls of the protective housing before the first and third assemblies are inserted.

Those skilled in the art recognize the words used are words of description, and not words of limitation. Many variations and embodiments will be apparent without departing from the scope and spirit of the invention as set forth in the appended claims.

The invention claimed is:

1. A fuel cell arrangement, comprising:
   at least one horizontally arranged fuel cell stack, which has a plurality of fuel cells, each of which includes an anode, a cathode and an electrolyte arranged between the anode and cathode;
   at least one fuel gas feed device to feed fuel gas to the anodes of the fuel cells;
   at least one anode gas withdrawal device to withdraw an anode waste gas from the anodes;
   at least one cathode gas feed device to feed cathode gas to the cathodes of the fuel cells;
   at least one cathode gas withdrawal device to withdraw cathode exhaust from the fuel cells; and
   at least one return device to return at least part of at least one of the anode waste gas and the cathode exhaust to the cathodes of the fuel cells;
   wherein the at least one return device includes at least one catalytic burner with catalyst material for burning of residual combustible gas contained in the anode waste gas, which is arranged laterally next to the fuel cell stack; and
   wherein the fuel cell arrangement is enclosed by a gas-tight protective housing and the catalytic burner is arranged on the inside of a side wall of the protective housing, and the catalytic burner is accessible from the outside through the protective housing via at least one cleaning opening, via which the catalyst can be replaced.

2. The fuel cell arrangement according to claim 1, wherein the catalytic burner has a top with at least one inlet opening, which communicates with a gas mixer for mixing of at least one of the anode waste gas, the cathode exhaust and fresh air.

3. The fuel cell arrangement according to claim 1, wherein the catalytic burner has a bottom with at least one outlet opening, which communicates with a collection line for collection of the waste gases being returned.

4. The fuel cell arrangement according to claim 1, wherein the catalytic burner includes a honeycomb catalyst.

5. The fuel cell arrangement according to claim 1, wherein the catalytic burner includes a pelletized catalyst.

6. The fuel cell arrangement according to claim 1, wherein the cleaning opening is a closable cleaning opening in the side wall of the protective housing.

7. The fuel cell arrangement according to claim 6, wherein the catalytic burner is arranged between a cathode output side of the fuel cell stack and the side wall of the protective housing containing the at least one cleaning opening.

8. The fuel cell arrangement according to claim 1, wherein the catalytic burner includes a permanently opened access having a gas-tight seal with an inside of the side wall of the protective housing.

9. A fuel cell arrangement, comprising:
at least one horizontally arranged fuel cell stack comprising a plurality of fuel cells, each of the fuel cells including an anode, a cathode and an electrolyte arranged between the anode and cathode;
at least one fuel gas feed device to feed fuel gas to the anodes of the fuel cells;
at least one anode gas withdrawal device to withdraw an anode waste gas from the anodes;
at least one cathode gas feed device to feed cathode gas to the cathodes of the fuel cells;
at least one cathode gas withdrawal device to withdraw cathode exhaust from the fuel cells; and
at least one return device to return at least part of at least one of the anode waste gas and the cathode exhaust to the cathodes of the fuel cells;
wherein the at least one return device includes at least one catalytic burner with catalyst material for burning of residual combustible gas contained in the anode waste gas, which is arranged laterally next to the fuel cell stack; and
wherein the fuel cell arrangement is enclosed by a gas-tight protective housing and the catalytic burner is arranged on the inside of a wall of the protective housing, and the catalytic burner is accessible from the outside through the protective housing via at least one cleaning opening, via which the catalyst can be replaced.

10. The fuel cell arrangement according to claim 2, wherein the gas mixer includes a first mixing zone for the mixing of the cathode exhaust and the fresh air, and the gas mixer includes a second mixing zone downstream of the first mixing zone into which the anode waste gas is introduced to the cathode exhaust and the fresh air from the first mixing zone.

11. The fuel cell arrangement according to claim 2, further comprising a distributor at an exit of the gas mixer, wherein the distributor widens from a first flow cross section at an input to a second flow cross section at an output, in which the output corresponds to the at least one inlet opening of the catalytic burner.

12. The fuel cell arrangement according to claim 9, wherein the at least one catalytic burner has a top with at least one inlet opening, which communicates with a gas mixer for mixing of at least one of the anode waste gas, the cathode exhaust and fresh air.

13. The fuel cell arrangement according to claim 12, wherein the gas mixer includes a first mixing zone for the mixing of the cathode exhaust and the fresh air, and the gas mixer includes a second mixing zone downstream of the first mixing zone into which the anode waste gas is introduced to the cathode exhaust and the fresh air from the first mixing zone.

14. The fuel cell arrangement according to claim 12, further comprising a distributor at an exit of the gas mixer, wherein the distributor widens from a first flow cross section at an input to a second flow cross section at an output, in which the output corresponds to the at least one inlet opening of the catalytic burner.

15. The fuel cell arrangement according to claim 9, wherein the at least one catalytic burner has a bottom with at least one outlet opening, which communicates with a collection line for collection of the waste gases being returned.

16. The fuel cell arrangement according to claim 9, wherein the catalytic burner includes a honeycomb catalyst.

17. The fuel cell arrangement according to claim 9, wherein the catalytic burner includes a pelletized catalyst.

18. The fuel cell arrangement according to claim 9, wherein the cleaning opening is a closable cleaning opening in the side wall of the protective housing.

19. The fuel cell arrangement according to claim 17, wherein the catalytic burner is arranged between a cathode output side of the fuel cell stack and the side wall of the protective housing containing the at least one cleaning opening.

20. The fuel cell arrangement according to claim 9, wherein the catalytic burner includes a permanently opened access having a gas-tight seal with an inside of the side wall of the protective housing.

* * * * *